United States Patent [19]
Besnard et al.

[15] 3,692,736
[45] Sept. 19, 1972

[54] POLYESTER RESIN GRANULATES AND PROCESS FOR PREPARATION OF SAME

[72] Inventors: Jean-Claude Besnard, Deuil-La-Barre; Lylian M. L. Pasteur, Rueil-Malmaison, both of France

[73] Assignee: Resines Et Dispersions "Redis," Paris, France

[22] Filed: Aug. 17, 1970

[21] Appl. No.: 64,578

[30] Foreign Application Priority Data

Aug. 18, 1969 France...................6928212

[52] U.S. Cl. .............................................260/40 R
[51] Int. Cl. .............................................C08g 51/04
[58] Field of Search....................................260/40 R

[56] References Cited

UNITED STATES PATENTS 3,462,514  8/1969  Kurkowski et al. ...260/40 R X
3,485,789  12/1969  Guilbault..................260/40 R
3,503,919  3/1970  Cadus ..................260/40 R X

*Primary Examiner*—Lewis T. Jacobs
*Attorney*—McDougall, Hersh & Scott

[57] ABSTRACT

Free-flowing, non-tacky polyester resin compositions for use in molding and a method for the preparation of same wherein a polyester resin, a monomer, reinforcing fibers, an initiator, a thickener and a charge filler are mixed in at least four stages wherein at least the polyester resin, the monomer, the reinforcing fibers, the initiator and the charge filler are mixed in a first stage at ambient temperatures, the balance of the components are added and the resulting mixture mixed in a second stage until the composition has a dough-like consistence, the resulting composition is mixed in a third stage while cooling and the composition is mixed in a fourth stage in the presence of lamellar filler to imbed the filler in the composition whereby the composition is relatively non-tacky and free-flowing.

13 Claims, No Drawings

POLYESTER RESIN GRANULATES AND PROCESS FOR PREPARATION OF SAME

This invention relates to the preparation of granulates from composite materials or mixtures having a resin or plastic base, referred to in the art as "compounds," which are mixed and ready for use in the plastic processing industries, and to non-sticky granulates containing polyesters, strengthening agents, fibers and ultimately, charges or fillers which can be used in apparatus for molding by compression, transfer or injection, and to articles molded therefrom.

In the processing and molding of polyesters, and more particularly polyesters or mixtures of alkyd resins with monomeric materials, such materials are used in three forms, that is the "pre-impregnated" or "-prepreg" form, in the premix (i.e., putty or dough) form, or in the form of mass or molding powder.

Thus, pre-impregnated glass fiber mats are glass mats impregnated with mixtures of polyester resins and mineral fillers or charges. Such mixtures are generally used in the form of a solution in the monomer, and are applied by spraying or by impregnation.

The premix or molding compounds are doughs comprising the polyester resin reinforced with short glass fibers and containing fillers, a catalyst system, a lubricant and generally a pigment. In the preparation of these premix, there is frequently used a mixer of the Werner complex type. Thus, there is first introduced or mixed the charges and the lubricant and then the resin, the catalyst and the pigment, are added and mixed until a dough is obtained. Finally, the fibers are introduced.

The dry molding materials, sometimes called "dry-blends," are more or less coarse powders. If desired, one incorporates fibers and charges or fillers into these powders by melting the resin in the presence of a solid or liquid cross-linking agent (interlacing agent) and then the mass is crushed in the cooled state.

While they afford certain advantages, these compositions have a certain number of deficiencies which limit the possibilities of uses and applications and methods of processing.

The pre-impregnated glass fiber mats provide molded products having excellent mechanical properties, for example, flexural strengths from 1,100 to 2,800 $kg/cm^2$, moduli in flexure from 70,000 to 125,000 $kg/cm^2$, a resilience/volume (standard specification AFNOR 51,035) from 15 to 25 $kgcm/cm^3$. However, they can be used only in compression molding to mold parts or articles having simple shapes since such compositions are incapable of flowing properly in the case of molds having complicated impressions. When such compositions are used in more complex molds, there is observed the phenomena of washing of fibers or of unsatisfactory flowing and distribution of the fillers.

With the premix, one obtains inferior mechanical properties in certain respects, the measured values being: flexural strength from 850 to 1,400 $kg/cm^2$, modulus in flexure from 110,000 to 160,000 $kg/cm^2$, resilience/volume (impact strength) from 2 to 3 $kg/cm/cm^3$. Moreover, these compositions are not always easily handled. While they may be used relatively easily for compression molding, special feed devices must be employed for use in injection molding devices.

In the case of molding powder, the disadvantages are the following: if a solid cross-linking agent is used, the cost is quite high; if a liquid cross-linking agent is used, the amount of this latter which can be incorporated during the manufacture of the powders is less than that which is normally required to obtain certain molded articles. In addition, the mechanical properties are mediocre, both on account of the degradation of the fibers by crushing and by reason of an insufficient amount of liquid cross-linking agent. For instance, there are obtained the following values: flexural strength from 500 to 800 $kg/cm^2$, modulus in flexure from 60,000 to 90,000 $kg/cm^2$, resilience/volume from 2 to 3 $kgcm/cm^3$.

It is an object of this invention to provide a process for the manufacture of free-flowing, non-sticky granulates from unsaturated polyester resins, said granulates being useful directly and without the need for special devices on conventional machines for compression molding, transfer or injection molding.

In accordance with the concepts of the present invention, fre-flowing, non-tacky polyester base granulates are prepared by granulating a mixture of a polyester containing ethylenic unsaturation, a monomer, reinforcement fibers, fillers and initiators containing a thickener whereby the granulation is carried in several stages including a first stage wherein at least the polyester resin and the monomer, the reinforcing fibers and the initiator system are mixed at about room temperatures, a second stage wherein the mixture from the first stage and the balance of the components to be used are mixed until a dry dough is obtained, a mixing stage with cooling and finally a mixing stage with imbedding fillers.

In the preferred practice of the invention, the overall composition of the product includes, on a basis of 100 parts by weight of the polyester resin:

25 to 40 parts by wt. of monomer
0.1 to 30 parts by wt. of thickener
0.1 to 40 parts by wt. of lamellar, imbedding fillers
0.1 to 180 parts by wt. of reinforcing fibers
0.1 to 200 parts by wt. of mineral and/or organic charges or fillers with the total of the charges and/or fillers and the reinforcing fibers not exceeding 150 parts by weight per 100 parts by weight of the resin.

According to a preferred embodiment of the invention, the process of the invention is carried out in a kneader mixer in which the first stage is carried out at ambient temperatures for 0.25 to 1 hours, the second stages is carried out at a temperature within the range of 30° to 90° C. for 0.5 to 2 hours, the third stage is carried out at a temperature below 25° C. for 0.5 to 2 hours and the last stage, during which the lamellar fillers are imbedded in the compositions, is carried out for 5 minutes to 0.5 hour.

The present invention also relates to granules having a flattened shape of the oblate ellipsoid or lenticular type having a diameter between 2 and 5 mm., a thickness between 1 and 3 mm. and a bulk density between 0.7 and 1.8 $g/cm^3$ which are prepared according to the process of this invention.

In the preferred embodiment of the invention the content of the composition of the invention, based on 100 parts by weight of the polyester resin containing ethylenic unsaturation, is:

25 to 40 parts of monomer 2 to 20 parts of thickener, preferably in the form of a derivative of a Group II metal 15 to 50 parts of the inorganic lamellar fillers 30 to 80 parts of reinforcing fibers 30 to 80 parts of the charges or fillers As the polyester or alkyd resin containing ethylenic unsaturation, use can be made of any of a variety of such resins known to the art. Preferred polyesters used in accordance with the concepts of the present invention are those polyesters prepared by the condensation of 0.2 to 1 moles of at least one dicarboxylic acid or anhydride containing ethylenic unsaturation, 0.8 to 0 moles of at least one dicarboxylic acid or anhydride containno ethylenic unsaturation and 1 mole of polyhydric alcohol.

As the acid or anhydride containing ethylenic unsaturation, use can be made of those acids containing four to 20 carbon atoms and their anhydrides. Representative are the maleic, fumaric, citraconic, mesaconic, itaconic acids and anhydrides.

As the acid or anhydride which does not contain ethylenic unsaturation, use is preferably made of aromatic and saturated aliphatic dicarboxylic acids containing three to 20 carbon atoms and their corresponding anhydrides. Illustrative are the acids and/or anhydrides of phthalic, isophthalic, tetrahydrophthalic, hexahydrophthalic, endomethylene-tetrahydrophthalic, hexachloroendomethylene-tetrahydrophthalic, succinic, adipic, azelic, sebacic, glutaric, pimelic, tetrabromophthalic acids, chloran and phenylindene dicarboxylic acid.

As the polyhydric alcohol, use can be made of alcohols containing two to 15 carbon atoms and two-four hydroxy groups. In the preferred practice of the invention, use is made of a dihydric alcohol alone or in admixture with a tri- and/or tetra- hydric alcohol.

Representative polyhydric alcohols include ethylene glycol, diethylene glycol, triethylene glycol, propylene glycol, dipropylene glycol, tetrapropylene glycol, 1,4-butanediol, bis-phenol-A, hydrogenated bisphenol-A, 2,3-butylene glycol, 1,4-butylene glycol and 1,3-butylene glycol, 1,5-pentanediol, 2,2,4-trimethyl-1,3-pentanediol, dibromo-neopentyl glycol, neopentyl glycol, 1,4-cyclohexane-dimethanol, 2,2,4,4-tetramethyl-cyclobutanediol, etc. The polyalcohols having a functionality greater than 2 which can be used in order to initiate a pre-cross-linking of the resin include glycerol, pentaerythritol, trimethylol propane.

As monomers to be incorporated, use can be made of one or more compounds having a reactive double bond. Representative monomers suitable for use in this invention include styrol, chlorostyrene, dichlorostyrene, alpha-methylstyrene, vinyltoluene, divinylbenzene, vinyl acetate, N-vinyl pyrrolidone, vinyl adipate, methyl and vinyl adipate, 2-vinylpyridine, methyl, propyl, isopropyl, butyl, isobutyl, allyl, lauryl, stearyl, ethylene glycol, dimethylaminoethyl methacrylates or acrylates; ethylene glycol dimethacrylate; bis-phenol dimethacrylate and diacrylate; furfuryl acrylate; acrylonitrile, diallylic phthalate, diallylic isophthalate, triallylic cyanurate; diallylic maleate and fumarate; allyl diglycolate, allyl methacrylate, allyl-malonate, trimethylpropane-diallyl-ether.

As reinforcing fibers, there can be used glass fibers in proportions varying in a wide range from 0.1 to 150 parts by weight, preferably between 0.1 to 80 parts per 100 parts of resin, with the fibers having lengths from 0.1 to 25 mm.

For high rates of glass or great lengths of fibers one obtains granules having less regular shape and dimensions and more difficult to define, but which still are useful for feeding an injection press. The fibers may be on sale(commercially available) in 100, 200, 400 decitex or 800 decitex. There can also be used other types of fibers such as asbestos, carbon, graphite fibers, metallic fibers, vegetable fibers such as sisal, cotton, high polymeric fibers such as polyester fibers, polyacrylonitrile, polyamides such as "nylon," polypropylene, polyvinyl alcohol and ceramic fibers such as boron fibers and whiskers.

The useful imbedding fillers are the fillers of the lamellar type such as mica, talc, kaolin.

As mineral or inorganic charges or fillers there can be used any of the usual fillers incorporated into polyester compounds such as aluminum, oxide, antimony oxide, barium carbonate, barium sulfate, bentonites, calcium carbonate, diatomaceous earth, feldspar, graphite, crushed glass, magnesium carbonate, magnesium silicate, pumice stone, silica, quartz, metal stearate, titanium oxide, calcium sulfate and chalk.

As initiator(initiating) peroxide to be incorporated, there can be used compounds which disintegrate at a sufficiently high temperature in order that there is no cross-linking or setting in the preparation of the granules or in the mandrel of the press during the injection shot. There can be selected any of the organic peroxide cross-linking agents as represented by the following compounds: cumyl peroxide, diisopropylbenzene hydroperoxide, para-menthane hydroperoxide, 2,5-dimethyl-2,5-di(tert-butylperoxy)-hexyne-3; 3,2,5-dimethyl-2,5-di(tert-butylperoxy)-hexane-3, tert-butyl hydroperoxide, tert-butyl peroxide, tertbutyl perbenzoate, cumene hydroperoxide; 2,2-bis-di-tert-butyl-peroxybutane, tert-butyl and cumyl mixed peroxide, as well as a number of others.

As thickener there are used products which play a very particular and important part in the granulation operation by the fact that they make possible the increasing of the resin viscosity, such as metal oxides of the second group, including magnesium oxide, zinc oxide, calcium oxide, barium oxide, or stannous chloride, aluminum trichloride, silicon tetrachloride, aluminum dioctoate and aluminum octate.

As the organic fillers there can be used various organic fillers which serve to improve the superficial state of the molded parts to reduce the shrinkage, to facilitate the removal from the mold, to improve the flowing of the material in the cavity during the molding. Representative of such organic filler include organic polymers such as polyvinyl chloride, polyethylene, polyamides("Nylon," polycarbonate, polyphenylene oxide, styrenebutadiene-acrylonitrile terpolymer, styrene-acrylonitrile copolymer, polystyrene(powdered or dissolved in styrol, acrylic and methacrylic polymers(solid or in solution in styrol or in their respective monomer), methyl acrylate and methyl-, isopropyl-, butyl-methacrylates.

If desired, use can be made of various oxidation inhibitors known to the art. As inhibitors, there are used well-known compounds or antioxidants such as hydroquinone, tertebutyl-pyrocatechol, benzoquinone, di-tert-butylbenzoquinone.

As other optional additives, use can be made of pigments and/or dyestuffs, anti-U.V. agents, and lubricants, such as metal stearates or waxes.

Any of a variety of mixing or blending devices can be used in forming the granules of the invention, such as horizontal mixers with Z-shaped blades or vertical mixers preferably with planetary motion and equipped with hook-shaped blades, with helical blades or planar blades with round-nosed or plane irons or with single or double arms.

The speed of the blades can be conveniently maintained between 20 and 300 r.p.m.

By way of a non-limiting example, the following is illustrative of the practice of the invention. Into a tight through-mixes heated to a temperature between 25° and 100° C., according to the viscosity of the resin used, there is introduced successively in the sequence:
  a) the polyester resin and its monomer, the initiating peroxide of the cross-linking, the glass fibers;
  b) the mineral fillers, eventually fibers other than glass fibers, the lubricant, the thickener;
  c) the lamellar imbedding fillers.

The mixture of ingredients (a+b) is kneaded at a temperature above room temperature, preferably between 30° and 100° C. After a mixing time which varies depending on the type of polyester resin used, the paste or dough thickens. The mixing is carried until the mass disintegrates, that is the dough (paste) breaks. Then the mass is cooled at a temperature comprised between 0° and 20° C., depending on the consistency of the dough and the degree of tackiness. It is helpful to operate with fast stirring in order to shred rapidly the material. When the granules have a shape and a size close to those desired, they are then imbedded by means of lamallar filler(mica, talc, clay) if they are still slightly tacky. The operation time may split up in the following manner: homogenizing of the compound — from 30 to 90 minutes according to the type of resin and the temperature, granule forming operation alone — from 30 to 90 minutes.

The product obtained appears in the form of lentil-shaped and even ear-shaped granules, or balls. The sizes of these granules may be modified at will by varying the duration of the mixing and by imbedding in the product a preferably lamellar mineral filler. The apparent density of these granules varies between 0.7 to 2. Generally, it is often equal to 1.

These granules are not tacky, do not clump when they are stored at room temperature or at temperatures up to 35° C. They flow freely during handling and in the hopper for the feed of molding presses, such as injection presses. With these latter one can achieve the molding by compression, transfer, extrusion and injection. The shelf life is of several months since the peroxides used disintegrate only at high temperatures.

Generally speaking, with products prepared according to this invention, the injection molding can be led under the following conditions. There is used a standard injection press equipped with a conical profiled screw having a low compression ratio, with a transfer screw or even with a conical profiled screw having a compression ratio below 1, that is to say, operating in decompression, in order to avoid the degradation of the fibers. One may advantageously use the injection press with screw according to the application filed in France on Feb. 25, 1969 under PV No. 69.04.764. Thus, degradation of the fibers can be completely avoided. The temperature profile is the following: 20° on the feed zone from 50° to 80° on the following zones, the injection pressure is from 800 to 1400 kg/cm$^2$, the after-pressure is from 500 to 1,000 kg/cm$^2$ and the temperature of the mold of 160° C with an injection rate of 2 seconds.

There preferably is used a nozzle having a relatively large diameter(for instance, 8 mm.) in order to avoid the degradation of the fibers at the inlet of the mold. One does not use a non-return ring for this same reason. Under such conditions, the device can be operated with cycles of duration below 1 minute in order to produce molded parts or pieces of 4 mm. in thickness.

The mechanical proportion of the parts or pieces obtained are equivalent or superior to those of parts molded from a premix glass fiber mat. For instance, there is obtained a flexural strength from 850 to 1,500 kg/cm$^2$, a modulus in flexure from 90,000 to 160,000 kg/cm$^2$ and a impact strength/volume from 0.5 to 4 kgcm/cm$^3$. Of course, the mechanical properties are very variable according to the type of mold and the orientation of glass fibers. This latter depends on the design of the mold, the injection point entering into the mold and the nozzle type. These very interesting properties are due to the fact that the granules comprise long fibers, a high monomer content and that they are prepared in a mixer in which the shearing rate is low.

Hereinafter, there are given examples which are provided by way of illustration, and not of limitation, of granulated compounds manufactured from various resins and the results of the measuring of the mechanical properties on the molded parts or articles from the granulates by using an injection press equipped with a screw according to the application PV No. 69.04.764 already mentioned.

In the formulation of these compounds there are used additives which are commercially available and, for simplicity, these additives are labelled with their tradenames which are better known to those skilled in the art than their actual chemical name. They are:
  a. "Perkadox Y 1440" or 2,4-bis-tertiobutylperoxyisopropylbenzene sold by the Societe Nourylande;
  b. "Micromica" sold by the Societe Adriss, or
  c. HET-acid = hexachloroendomethylene-tetrahydrophthalic acid.

In the following examples, all percentages or parts are expressed by weight unless otherwise specified.

EXAMPLE 1

The polyester resin used in this example is a pre-cross-linked condensation resin prepared from the following reagents in the stated ratios:

| | |
|---|---|
| maleic anhydride | 0.5 mol |
| isophthalic acid | 0.5 mol |
| diethylene glycol | 1 mol |
| trimethylolpropane | 0.05 mol |

The resulting resin is dissolved in styrol to provide a mixture (hereinafter referred to as "mixture A") containing 22 percent of styrol; the viscosity at 25° is 50 poises.

Mixture A is used as follows.

Into a planetary moving vertical mixer equipped with hook shaped blades, there are introduced:

| mixture A | 100 parts |
|---|---|
| "Perkadox Y 1440" | 3.75 parts |
| glass fibers with 3 mm. in length at 400 decitex | 50 parts | and the resulting composition is mixed for half an hour at room temperature; the blades are rotated at 64 r.p.m. and the planetary at 28.5 r.p.m.

Afterward there is introduced:

| calcium carbonate | 32.0 parts |
|---|---|
| short asbestos fibers | 22.5 parts |
| lubricant | 3.75 parts |
| magnesia | 5 parts |

The resulting mixture is heated to 70° and mixed for 1 hour. At this point the mass has the consistency of a compact dough. Following this, dough is cooled by means of a water + ice mixture in order to reduce the temperature to a temperature between 15° and 20° C.

The resulting composition is mixed under these temperature conditions for 1¼ hour, followed by the addition of:

| "Micromica" | 25 parts |
|---|---|
| talc | 8.5 parts | and the device is rotated for a quarter of an hour.

The operation, which lasted a total of 3 hours, is stopped and the product is removed from the mixer.

The product appears in the form of lenticular granules.

The majority of the granules have a diameter of 3-5 mm., a thickness of 1-2 mm. The bulk density of the product is between 0.96 and 1.0.

These granules are used in molding using an injection press equipped with a screw according to the application PV No. 69.04.764 already mentioned.

EXAMPLE 2

The polyester used in this example is used as a basic resin obtained from the following reagents:

| maleic anhydride | 0.57 mol |
|---|---|
| adipic acid | 0.18 mol |
| phthalic anhydride | 0.25 mol |
| diethylene glycol | 1 mol | having an acid number of 22.

This resin is dissolved in styrol to the extent of 33 percent of styrol in order to obtain a product having a viscosity of 54 poises at 25° C.

This resin called mixture B is used as follows.

Into an ordinary blade mixer rotating at 70–75 r.p.m., there are introduced at first:

| mixture B | 100 parts |
|---|---|
| "Perkadox Y 1440" | 3.75 parts |
| glass fibers of 3 mm, 400 decitex | 50 parts | then after a mixing of a quarter of an hour, there is filled:

| calcium carbonate | 32.0 parts |
|---|---|
| short asbestos fibers | 22.5 parts |
| lubricant | 3.75 parts |
| aluminum isopropylate | 5 parts |

After mixing for 1¼ hour, the mixture is cooled below 20° C., and the mixing is carried on for 1¼ hour followed by the addition of the following in the manner stated in Example 1:

| "Micromica" | 25 parts |
|---|---|
| talc | 8.5 parts |

Afterwards the resulting mixture is mixed for a quarter of an hour and the product which appears in the form of elongated flattened granules having the shape of an ear, is discharged from the mixer.

Although different from those of the preceding example, the granules are suitable for the injection molding.

From the herein above mentioned mixture, by mixing such as previously described, there are obtained molded products having the following mechanical properties; flexural strength 1,400 kg/cm$^2$, flexural modulus of elasticity of 130,000 kg/cm$^2$, impact strength/volume 1.5 kg/cm$^3$.

EXAMPLE 3

The polyester used in this example is a pre-cross-linked resin obtained from the following reagents:

| maleic anhydride | 0.66 mol |
|---|---|
| phthalic anhydride | 0.33 mol |
| propylene glycol | 1 mol |
| pentaerythritol | 0.04 mol |

This resin is dissolved in order to obtain a mixture C containing 34 percent of styrol and a viscosity of 140 poises at 25° C.

By use of the processing steps described in Example 1, a compound is prepared with the following ratios:

| mixture C | 100 parts |
|---|---|
| "Perkadox Y 1440" | 3.75 parts |
| lubricant | 3.75 parts |
| zinc oxide | 10 parts |
| "Micromica" | 25 parts |
| talc | 7.5 parts |
| glass fibers of 3 mm. in length, 400 decitex | 100 parts |

There is obtained lamellar granules having diameters between 2 and 5 mm. and thicknesses comprised between 0.5 and 2 mm.

Using the above compound, the products molded by injection have the following properties: flexural strength 1,150 kg/cm$^2$, flexural modulus of elasticity 160,000 kg/cm$^2$, impact strength/volume 1.5 kgcm/cm$^3$.

EXAMPLE 4

In this example, the polyester resin is prepared from fumaric acid and bis-phenol-A and ethylene oxide in equimolar proportion and has an acid number of 20.

The above condensation product is dissolved in styrol in order to obtain a 35 percent styrol solution which has a viscosity of 60 poises at 25° C, called "mixture D."

The procedure of Example 2 is repeated using:

| | |
|---|---|
| mixture D | 100 parts |
| "Perkadox Y 1440" | 3.75 parts |
| calcium carbonate | 29 parts |
| lubricant | 3.75 parts |
| magnesia | 5 parts |
| "Micromica" | 25 parts |
| talc | 8.5 parts |
| asbestos fiber with an average length of 3 mm. | 75 parts |

The mixing is carried out as described in Example 2 and molded products are prepared from the product, which appears in the form of lenticular pellets having a diameter from 1 to 4 mm., a thickness from 0.5 to 2 mm. and a bulk density from 1.2 to 1.3. The molded products have the following mechanical properties: flexural strength 900 kg/cm$^2$, flexural modulus of elasticity 160,000 kg/cm$^2$, impact strength/volume 0.5 kgcm/cm$^3$.

EXAMPLE 5

From 0.5 mol of maleic anhydride, 0.5 mol HET-acid and 1 mol of ethylene glycol, there is prepared a resin having an acid number of 30 which is dissolved in styrol to obtain a 28 percent styrol solution having a viscosity of 62 poises at 25° C., denoted as mixture E.

Therefrom, according to the procedure of Example 2, there is prepared a compound with the following proportions:

| | |
|---|---|
| mixture E | 100 parts |
| "Perkadox Y 1440" | 3.75 parts |
| calcium carbonate | 32 parts |
| short asbestos fibers | 22.5 parts |
| lubricant | 3.75 parts |
| magnesia | 5 parts |
| "Micromica" | 25 parts |
| talc | 8.5 parts |
| long carbon fibers | 50 parts |

After mixing as previously stated, there is obtained granules such as in Example 2 and from these latter moldings are prepared. The latter have the following mechanical properties: flexural strength 1,000 kg/cm$^2$, flexural modulus of elasticity 160,000 kg/cm$^2$, impact strength/volume 0.75 kgcm/cm$^3$.

EXAMPLE 6

In this example, there is used a resin obtained from maleic anhydride, HET-acid, propylene glycol with diallylic phthalate as the monomer having a viscosity of 125 poises at 25° C. The mixture is referred to as "mixture F." For the granulation there is used the procedure of Example 1, the proportions being the following:

| | |
|---|---|
| "mixture F" | 100 parts |
| "Perkadox Y 1440" | 3.75 parts |
| calcium carbonate | 32 parts |
| short asbestos fibers | 22.5 parts |
| lubricant | 3.75 parts |
| magnesia | 2 parts |
| "Micromica" | 25 parts |
| talc | 8.5 parts |
| glass fibers 3 mm., 400 decitex | 50 parts |

From granules prepared from the mixture as stated above, there are obtained molded products having the following mechanical properties: flexural strength 1,500 kg/cm$^2$, flexural modulos of elasticity 160,000 kg/cm$^2$, impact strength/volume 1 kgcm/cm$^3$.

The granules prepared in accordance with the concepts of the present invention do not clump or adhere together and are quite stable for prolonged periods of storage. Thus, the advantages of the process and product of the present invention are evident to those skilled in the art, and exist with respect to handling the material, such as in bagging, feeding of processing machines and the like. As indicated above, the granules prepared in accordance with this invention are suitable for injection molding. When it is desired to use the composition of the invention for compression or transfer, it is similarly desirable to make use of granules containing relatively small quantities of lamellar fillers, and even granules which do not contain such lamellar fillers. The granules of the present invention can also be used in molding by extrusion. However, in this case, the extrusion molding device should be provided with the necessary oven and support facility in order to achieve the desired hardening in the extruder head.

It will be apparent to those skilled in the art that the polyester compositions and molded products formed therefrom which are prepared in accordance with this invention can be used in a wide variety of applications, including the electrical industry, the automobile industry and the electric household appliance industry.

It will be understood that various changes and modifications may be made in the details of procedure, formulation and use without departing from the spirit of the invention, especially as defined in the following claims.

What is claimed is:

1. A process for preparing free-flowing, non-tacky plastic compositions for use in molding wherein the composition contains 25–40 parts by weight of a monomer, 0.1–180 parts by weight of reinforcing fibers, a peroxide initiator, 0.1–30 parts by weight of a thickener and 0.1–200 parts by weight of a charge selected from the group consisting of an organic filler and an inorganic filler per 100 parts by weight of a polyester resin containing ethylenic unsaturation, comprising the steps of mixing for 0.25 to 1 hour at least the polyester resin, the monomer, the reinforcing fibers, the initiator and the charge in a first stage at ambient temperature, adding the balance of the components and mixing in a second stage until the composition has a dough-like consistency, mixing in a third stage for 0.5 to 2 hours while cooling the composition to a temperature within the range of 0° to 25° C, and mixing the composition in a fourth stage in the presence of a lamellar filler for a time sufficient to imbed the lamellar filler in the composition whereby the composition is rendered non-tacky and free-flowing.

2. A process as defined in claim 1 wherein the second stage is carried out at an elevated temperature within the range of 30° to 90° C.

3. A process as defined in claim 1 wherein the first stage is carried out for a time within the range of 0.25–1 hour, the second stage is carried out for a time within the range of 0.5–2 hours, the third stage is carried out for a time within the range of 0.5–2 hours and the fourth stage is carried out for a time within the range of 5 minutes to 0.5 hour.

4. A process as defined in claim 1 wherein the polyester resin is a resin prepared by the condensation of 0.2–1 mole of at least one compound selected from the group consisting of a dicarboxylic acid and a dicarboxylic acid anhydride containing ethylenic unsaturation, 0.8–0 mole of at least one compound selected from the group consisting of dicarboxylic acid or dicarcoxylic anhydride containing no ethylenic unsaturation and one mole of at least one polyhydric alcohol.

5. A process as defined in claim 4 wherein the dicarboxylic acid or anhydride containing ethylenic unsaturation is selected from the group consisting of ethylenically unsaturated dicarboxylic acids containing four to 20 carbon atoms and their corresponding anhydrides.

6. A process as defined in claim 4 wherein the dicarboxylic acid or anhydride containing no ethylenic unsaturation is selected from the group consisting of aromatic and saturated aliphatic dicarboxylic acids containing three to 20 carbon atoms and their corresponding anhydrides.

7. A process as defined in claim 4 wherein the polyhydric alcohol is an alcohol containing two to 15 carbon atoms and two to four hydroxy groups.

8. A process as defined in claim 1 wherein said monomer is selected from the group consisting of styrol, chlorostyrene, dichlorostyrene, alpha-methylstyrene, vinyltoluene, divinylbenzene, vinyl acetate, N-vinyl pyrrolidone, vinyl adipate, methyl and vinyl adipate, 2-vinylpyridine, methyl, propyl, isopropyl, butyl, isobutyl, allyl, lauryl, stearyl, ethylene glycol, dimethylaminoethyl methacrylates or acrylates; ethylene glycol dimethacrylate; bis-phenol dimethacrylate and diacrylate; furfuryl acrylate; acrylonitrile, diallylic phthalate, diallylic isophthalate, triallylic cyanurate; diallylic maleate and fumarate; allyl diglycolate, allyl methacrylate, allyl malonate, trimethylpropane-diallyl-ether.

9. A process as defined in claim 1 wherein the reinforcing fibers have lengths within the range of 0.1–25 mm.

10. A process as defined in claim 1 wherein the lamellar filler is selected from the group consisting of mica, talc and kaolin.

11. A process as defined in claim 1 wherein the thickener is selected from the group consisting of metal oxides of the Group II, stannous chloride, aluminum chloride, silicone tetrachloride, aluminum dioctoate and aluminum octoate.

12. A process as defined in claim 1 wherein the composition includes an additive selected from the group consisting of pigments, dyestuffs, anti-U.V. agents, lubricants, antioxidants and mixtures thereof.

13. Free-flowing, non-tacky granulates formed of a polyester base having a flattened base and a diameter within the range of 2–5 mm., a thickness within the range of 1–3 mm. and a bulk density within the range of $0.7 – 1.8$ g/cm$^2$ prepared by the method of claim 1.

* * * * *